UNITED STATES PATENT OFFICE.

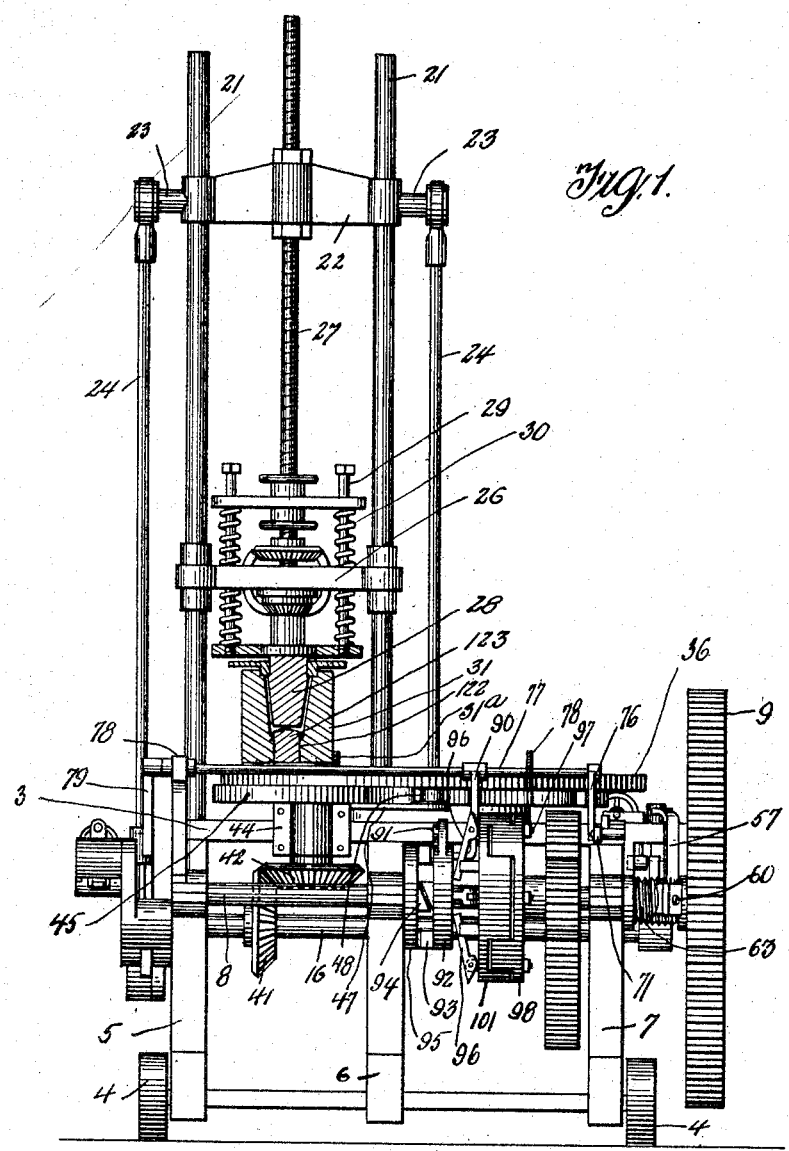

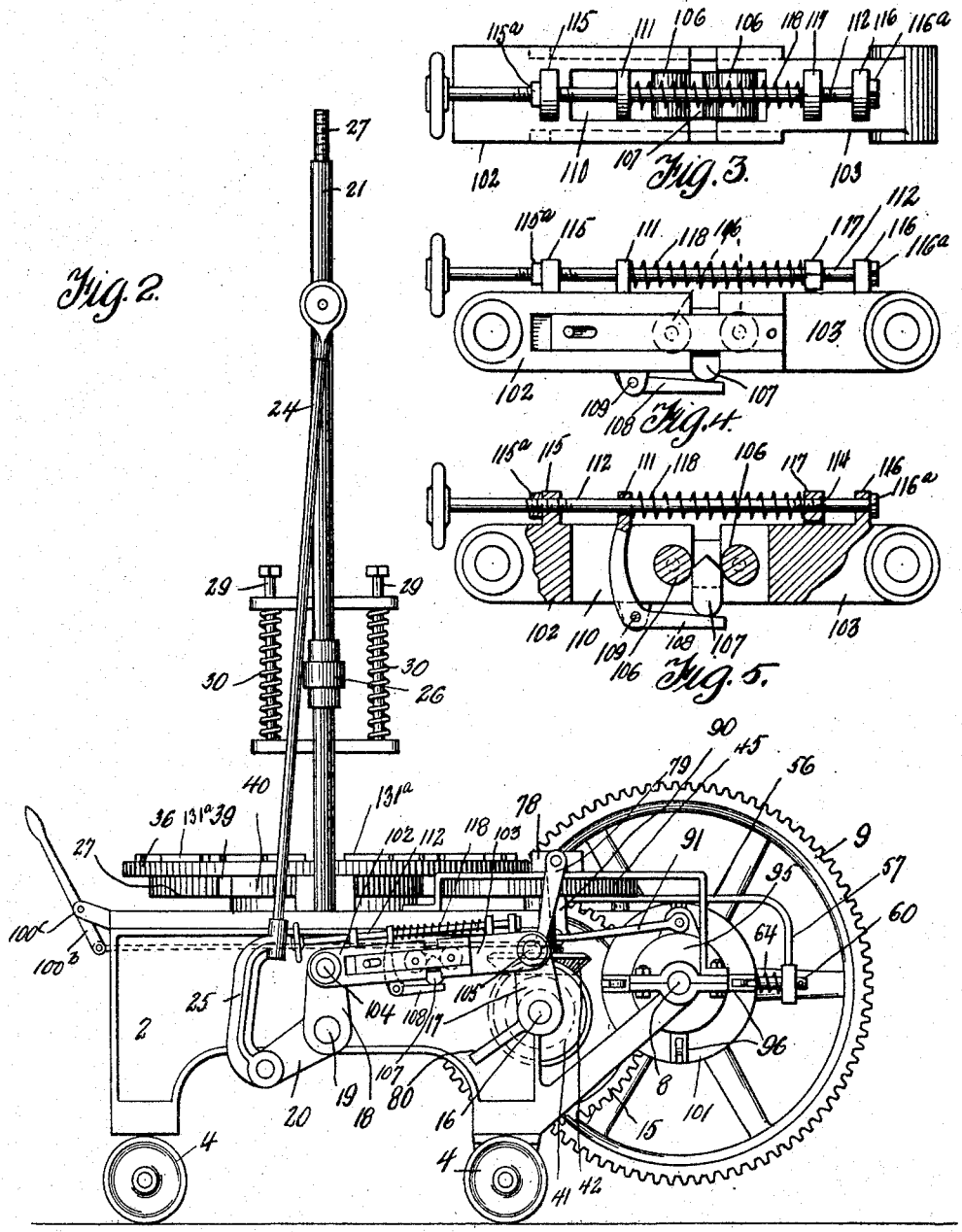

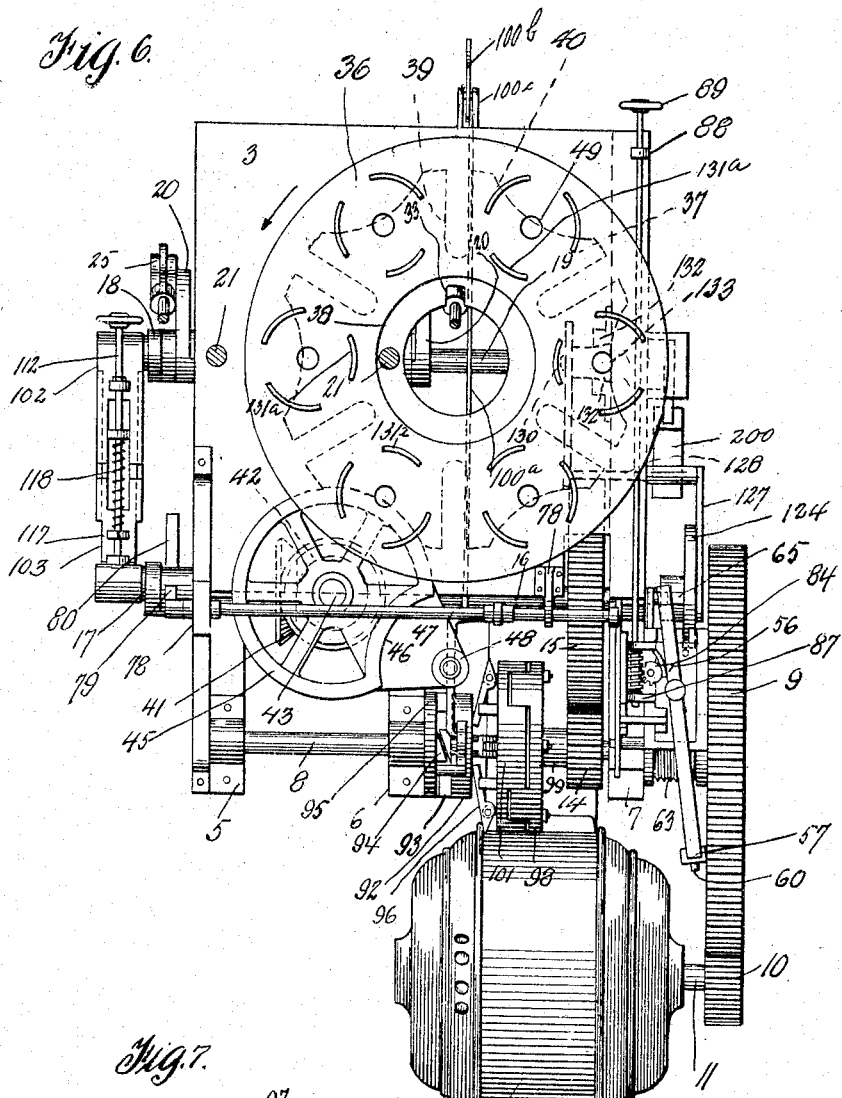

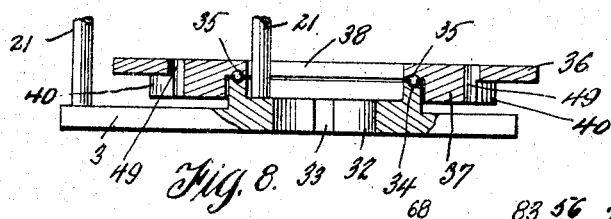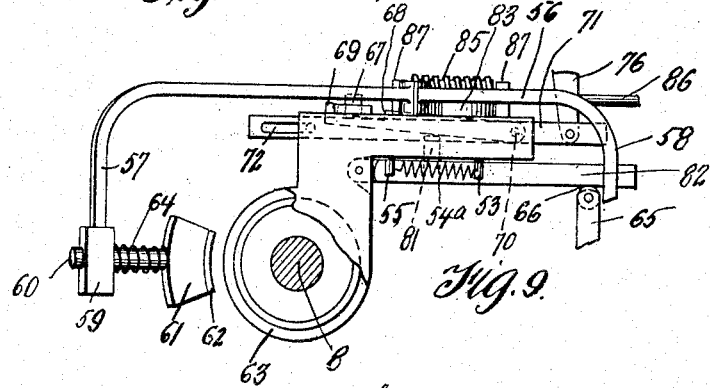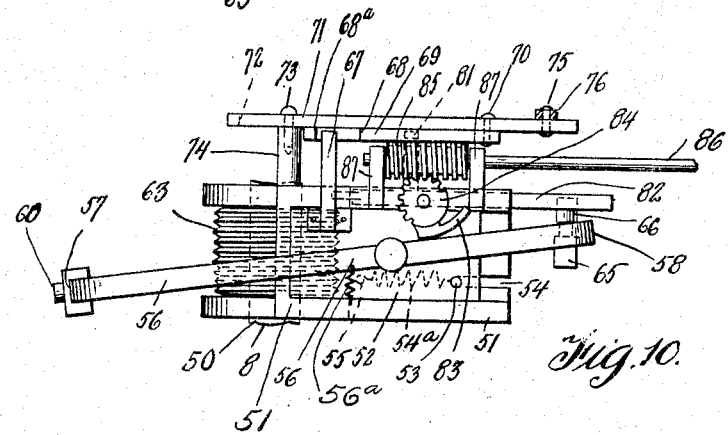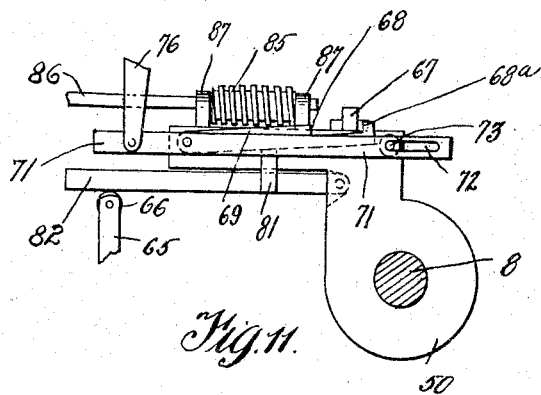

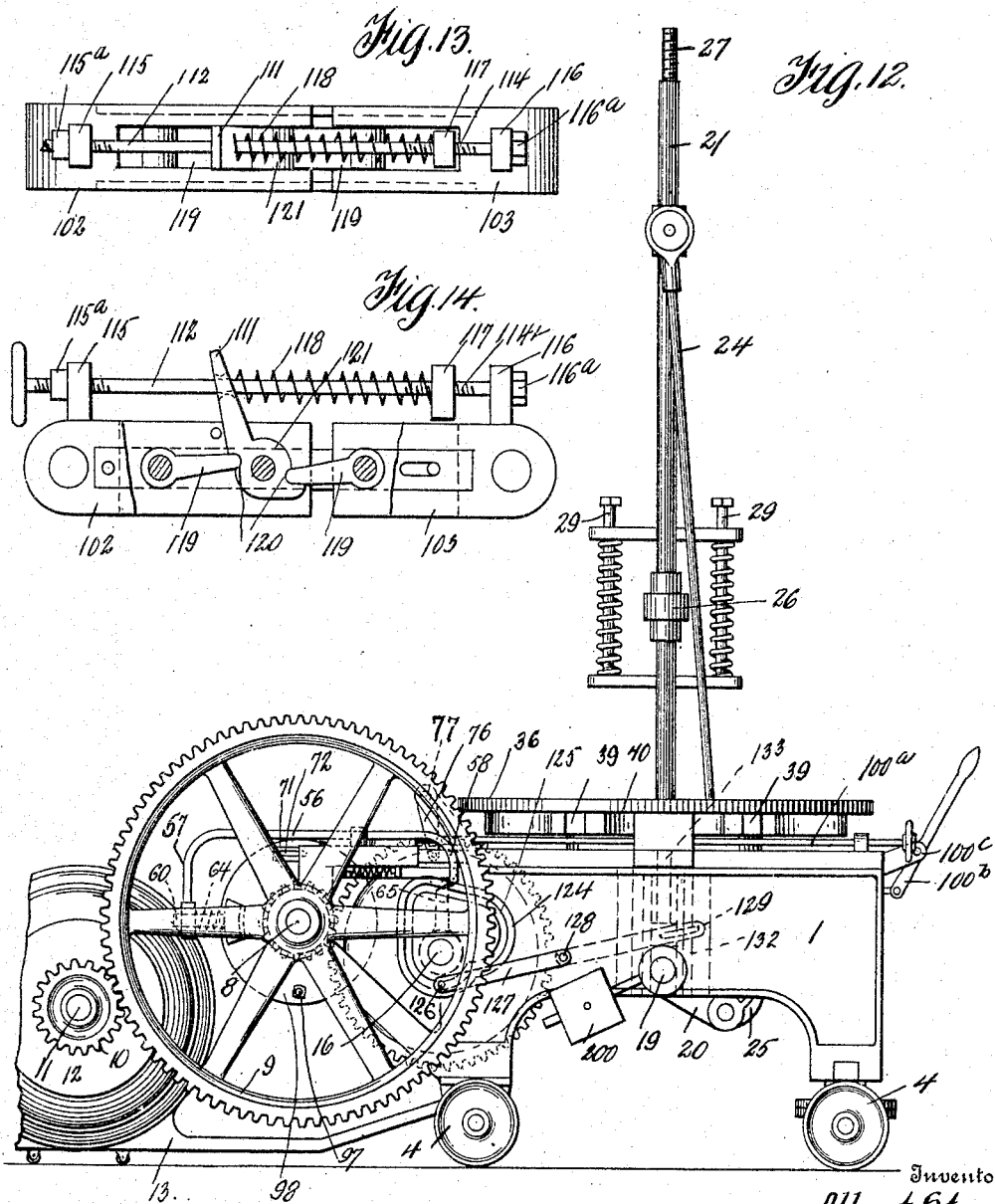

ALBERT STRUB, OF BEAVER FALLS, PENNSYLVANIA, ASSIGNOR OF ONE-FOURTH TO PIUS M. STRUB AND ONE-THIRD TO HENRY C. FRY, OF ROCHESTER, PENNSYLVANIA.

GLASS-MOLDING MACHINE.

947,204.      Specification of Letters Patent.      Patented Jan. 18, 1910.

Application filed December 10, 1908. Serial No. 466,871.

*To all whom it may concern:*

Be it known that I, ALBERT STRUB, a citizen of the United States of America, residing at Beaver Falls, in the county of Beaver and State of Pennsylvania, have invented certain new and useful Improvements in Glass-Molding Machines, of which the following is a specification, reference being had therein to the accompanying drawing.

This invention relates to a glass-molding machine, and the primary object of my invention is to provide positive and reliable means in connection with a machine of the above type for controlling the movement of the plunger of said machine.

Another object of my invention is the provision of automatic means in connection with a glass-molding machine or a power glass press, for automatically controlling the pressure of the plunger of the machine, and particularly the withdrawal of said plunger from a mold.

A further object of this invention is to improve that type of machine illustrated and described in Patent 804,069 granted to me November 7th, 1905. As stated in said patent, considerable trouble is experienced by ware being distorted due to a rapid withdrawal of a plunger and while the machine described in said patent overcomes this trouble to a certain degree, the present machine forming the subject matter of this application, aims to more perfectly control the withdrawal of the plunger from a mold and insure a uniformly shaped piece of ware.

Before describing the construction and operation of the various elements of my machine, which coöperate to perform certain work, it is proper to describe the general organization to which, in the construction of the machine, I prefer to resort.

Primarily there is a movable frame supporting a motor or similar source of power for operating my machine. Upon the frame is arranged a revoluble table adapted to be intermittently moved through the medium of what is termed "a Geneva movement", this movement being actuated by the motor.

Supported by the frame are standards and adapted to slide upon said standards is a cross head carrying the male mold-die adapted to enter mold-dies located upon the revoluble table. The cross head and the male mold-die constitute what will hereinafter be termed "the plunger".

Located in and upon the frame of the machine is a mechanism for reciprocating the plunger and at the right hand side of the machine, viewing the machine from the front thereof, is a primary dwell controller, while at the left hand side of the machine, viewing the latter from the front, is a secondary dwell controller. These controllers being adapted to govern and control the pressing and return movement of the plunger.

In connection with the above instrumentalities, I use an ejector for the pressed and molded product, said ejector being automatically actuated while the revoluble table is at a stand still, and during the pressing operation of the plunger.

In order that my invention will be clearly understood, the embodiments of the machine will be separately and then collectively considered, the main embodiments being referred to under the following captions:—

The movable frame and the operating shafts;

The revoluble table and the operating mechanism therefor;

The standards and the movable plunger;

The primary dwell controller;

The secondary dwell controller; and

The mold ejector.

Referring now to the drawings, Figure 1 is a front elevation of the machine partly broken away and partly in section, Fig. 2 is a side elevation of a portion of a machine illustrating the secondary dwell controller, this view showing the left hand side of the machine when viewed from the front of the machine, Fig. 3 is an enlarged plan of the secondary dwell controller, Fig. 4 is a side elevation of the same, Fig. 5 is a longitudinal sectional view thereof, Fig. 6 is a plan of the machine partly broken away, the motor end of the machine in this view being the front of the machine, Fig. 7 is a detail sectional view of a clutch forming part of the machine, Fig. 8 is a cross sectional view of a portion of the machine illustrating the revoluble table, Fig. 9 is an enlarged elevation of the primary dwell controller, Fig. 10 is a plan of the same, Fig. 11 is a side elevation of the primary dwell, illustrating the opposite side from that shown in Fig. 9, Fig. 12 is a side elevation of the machine illustrating the opposite side from that shown in Fig. 2 of the drawings, or in other words, the right-hand side of the machine when the latter is viewed from the front thereof, Fig. 13 is an enlarged plan of a modified form of a secondary dwell controller, and Fig. 14 is an elevation of the same.

*The movable frame and the operating shafts.*—The movable frame comprises side plates 1 and 2 connected by a top plate 3. The side plates 1 and 2 are supported by casters 4, whereby the frame can be easily moved from one place to another. The forward ends of the side plates 2 are provided with projecting arms 5, 6 and 7, having bearings receiving and supporting a revoluble motor driven shaft 8, which at the right hand side of the machine is provided with a large gear wheel 9 meshing with a small gear wheel 10, mounted upon the armature shaft 11 of the motor 12, said motor being carried by a truck 13 attached to the forward end of the glass molding machine.

Loosely mounted upon the shaft 8 is a small gear wheel 14 meshing with a large gear wheel 15, mounted upon a main operating shaft 16, journaled transversely of the machine in the side plates 1 and 2. The end of the shaft 16 at the left hand side of the machine is provided with a crank 17 which is connected by a secondary dwell controller to be hereinafter described in detail to a crank 18, mounted upon the end of a driven shaft 19 journaled transversely of the machine in the side plates 1 and 2. The shaft 19 at the left hand side of the machine and intermediate the ends thereof is provided with cranks 20 for a purpose that will hereinafter appear.

*The standards and the movable plunger.*— Upon the plate 3 and at the left hand side of the machine is mounted two standards 21, and slidably mounted upon said standards is the plunger of the glass molding machine. This plunger comprises a cross head 22 provided with wrist pins 23 to which are connected pitmen 24, said pitmen connecting by means of couplings 25 with the cranks 20 of the shaft 19, whereby when said shaft is rocked the cross head 22 will be vertically reciprocated upon the standards 21. Upon the standards 21 is also slidably mounted a crosshead 26 and in said crosshead is mounted a vertical screw 27 carrying a male-mold die 28. The crosshead 26 is provided with guide-rods 29 encircled by spiral springs 30, these springs being adapted to cause the pressure on the mold-ring while the glass is pressed within a female-mold die 31 placed in position for operation. These parts are common to the ordinary type of glass molding machine and need not be further described.

*A revoluble table and the operating mechanism therefor.*—The plate 3 (see Fig. 8) is provided with an opening 32 and the wall of said opening is cut away, as at 33 to provide clearance for the coupling 25 of the innermost pitman 24. Surrounding the opening 32 on the upper face of the plate 3 is a collar 34 having a ball race for antifriction balls 35. Revolubly mounted upon the antifriction balls 35 is a circular table 36 having a depending enlargement 37 surrounding the collar 34 for guiding and preventing displacement of said table. The table 36 is provided with a central opening 38 giving clearance for one of the standards 21 carried by the plate 3.

The enlargement 37 of the revoluble table 36 is provided with radially disposed grooves 39 and peripheral curved recesses 40 this enlargement constituting part of the mechanism employed in connection with the Geneva movement employed for operating and intermittently moving the table 36.

Mounted upon the shaft 16 is a beveled gear wheel 41 meshing with a beveled gear wheel 42 mounted upon a vertical shaft 43, journaled in a bearing 44, carried by the forward edge of the plate 3. Upon the upper end of the shaft 43 is mounted a wheel 45 having the rim thereof recessed as at 46, and at the same location provided with an extension 47 having a roller bearing 48. The recess 46 provides clearance for the periphery of the enlargement 37, while the roller bearing 48 is adapted to engage in the radial grooves 39 of said enlargement. The recesses 40 of the enlargement 37 provides clearance for the periphery or rim of the wheel 45 while the roller bearing 48 is out of engagement with said enlargement.

The table 36 and the enlargement 37 are provided with a plurality of circumferentially arranged openings 49 adapted to aline with similar openings formed in the plate 3.

The mold-dies 31 are supported upon the table 36 and are intermittently moved beneath the male-mold-die 28, as will hereinafter appear.

*Primary dwell controller.*—By a primary dwell controller, I mean a controller for governing the period of time a plunger consumes in giving molten glass the requisite pressure and the time consumed in the plunger leaving the mold. In other words, the controller governs how long the plunger shall dwell in the mold. This primary dwell controller is designed especially for heavy ware, requiring a dwell of from two to ten seconds, and where light ware as tumblers are being made, the primary dwell can be placed entirely out of operation whereby the machine can be simply operated with the secondary dwell in control.

Located upon the shaft 8, at the right hand side of the machine, are loosely mounted bearings 50, these bearings supporting a horizontal guide 51, and said guide bearings are held stationary by suitably securing the same to the arm 7. Slidably mounted in the guide 51 is a plate 52 having a depending pin 53 extending through a slot 54 formed in the guide 51. The lower end of the pin 53 is connected by a compression spring 54ª to a depending pin 55, carried by the guide 51. Upon the plate 52 is pivoted a lever 56 having depending ends 57 and 58. Secured to the depending end 57 of the lever 56 is a block 59 and slidably mounted in said block is the shank 60 of a feed head 61, said head being provided with screw threads 62 adapted to engage a screw or worm 63 mounted upon the shaft 8 between the bearings 50. Encircling the shank 60 of the feed head 61 is a coil spring 64 having the ends thereof attached to the block 59 and the head 61 for normally holding said feed head in the position illustrated in Fig. 9 of the drawings.

Upon the shaft 16 is mounted an arm 65 having a revoluble roller 66 (see Fig. 9) arranged at one side of the outer end thereof. The arm 65 is adapted to engage the depending end 58 of the lever 56 and move said lever and the plate 52 rearwardly, placing the spring 54ª under tension. When the plate 52 and the lever 56 are moved rearwardly, the feed head 61 engages the screw or worm 63, and when a revoluble motion is imparted to the screw or worm 63, the feed head 61 is fed toward the left hand side of the machine gradually swinging the depending end 58 out of engagement with the arm 65, allowing the spring 54ª to return the plate 52 to its normal position as best shown in Fig. 10 of the drawings. To return the lever 56 to its normal position, a spring 56ª is located upon the plate 52 and placed under tension when the lever swings to the left, the tension of said spring returning said lever to its normal position when released by the arm 65. When the plate 52 moves rearwardly, a finger 67 carried thereby engages the shoulder 68 provided therefor in a bar 69 pivotally connected, as at 70, to a slide rod 71, this slide rod having the forward end thereof slotted, as at 72, to receive a supporting pin 73 carried by the extension 74 of the guide 51. The rear end of the slide rod 71 is pivotally connected, as at 75, to a crank 76 carried by a transverse shaft 77 journaled in bearings 78 carried by the plate 3 of the machine. The shaft 77 at the left hand side of the machine is provided with an arm 79, and this arm is adapted to be impinged by an arm 80 mounted upon the shaft 16.

Before describing the function performed by the arm 80, reference will again be had to the bar 69 carried by the slide rod 71, this bar being normally supported at an inclination, as shown in Figs. 9 and 11 of the drawings by an extension 81 of an arm 82 pivotally held by the guide 51. The arm 82 is adapted to rest upon the revoluble roller 66 of the arm 65. In conjunction with the shoulder 68 of the bar 69 another shoulder 68ª is provided for a purpose that will hereinafter appear.

To control the lateral movement of the lever 57, a cam 83 is used. This cam is carried by a gear wheel 84 revolubly mounted in a horizontal position upon the guide 51. The gear wheel 84 is adapted to mesh with a worm 85 mounted upon a shaft 86, journaled in bearings 87, carried by the inner side of the guide 51. The shaft 86 extends rearwardly through a bearing 88 mounted upon the plate 3, the end of said shaft having a hand wheel 89 to permit of said shaft being rotated to adjust the cam 83.

Referring now to the transverse shaft 77, it will be noted that this shaft is provided with an arm 90 having a link connection 91 with a disk 92 loosely mounted upon the shaft 8. The left hand side of the disk 92 is provided with beveled lugs 93. The right hand side of the disk 92 is adapted to engage cams 96, pivotally carried by eyebolts 97 arranged in a clutch member 98, mounted upon the hub 99 of the gear wheel 14, whereby said gear wheel and clutch member 98 will rotate in unison.

Keyed upon the shaft 8 within the clutch member 98 is a wood disk 100 and adapted to engage said disk is a clutch member 101, loosely mounted upon the shaft 8 and the eyebolts 97, said clutch member 101 being forced by the cams 96 to frictionally engage the disk 100 and cause said disk, clutch members 98 and 101, gear wheel 14 and shaft 8 to rotate in unison.

Connecting with the arm 90 of the shaft 77 is a rod 100ª extending rearwardly beneath the plate 3 and connecting with a lever 100ᵇ pivotally mounted between brackets 100ᶜ carried by the rear edge of the plate 3.

*Secondary dwell controller.*—As heretofore stated, the secondary dwell controlling device connects the cranks 17 and 18. This device comprises two telescopic bifurcated housings 102 and 103 pivotally mounted upon the wrist pins 104 and 105 respectively of the cranks 18 and 17.

In the housings 102 and 103 are revolubly mounted rollers 106 and arranged to move between said rollers is a wedge 107. This wedge is supported by a bell crank lever 108 pivotally mounted between depending apertured lugs 109, carried by the housing 102. One arm of the bell crank lever 106 extends upwardly through the bifurcation 110 of the housing 102 and is apertured, as at 111, for a longitudinal rod 112. This rod is revolubly mounted in bearings 115, and 116, said rod having one end thereof provided with a nut 116ª and near the opposite end has a collar 115ª, said collar and nut limiting the movement of the rod 112. The rod 112 is threaded, as at 114 for a nut 117, said nut having a flat face engaging the housing 103, whereby said nut cannot rotate. Encircling the rod 112, between the nut 117 and the upwardly extending arm of the bell crank lever 108 is a spring 118.

A modification of the secondary dwell controller is shown in Figs. 13 and 14, wherein pivoted dogs 119 are used in lieu of the roller 106. These dogs are adapted to engage in notches 120 formed in bell crank lever 121 used in lieu of the bell crank lever 108.

The secondary dwell controller is used for light ware and controls the dwell of the plunger from zero to two or three seconds. The dwell controller also controls the pressure on the glass and prevents the glass from being unduly pressed or distorted. This secondary dwell controller can be used entirely independent of the primary dwell controller and corresponds approximately to the controller disclosed in my Patent No. 804,069.

*The mold ejector.*—The molds 31 used upon the revoluble table 36 are provided with central openings 122 and fitting in these openings are valves 123 of a greater diameter than the openings 49 of the table 31 and the plate 3, whereby when said molds are mounted over the openings 49, the valves 123 cannot drop through said openings.

The shaft 16 is provided at the right hand side of the machine with a heart-shaped cam 124 having a cam groove 125 formed therein. Engaging in the cam groove 125 is a pin 126 carried by the crank arm 127 of a shaft 128, journaled in the side plate 1 of the machine. The inner end of the shaft 128 is provided with a slotted crank arm 129, and extending into the slot of said arm is a pin 130, (see Fig. 6) carried by a block 131 slidably mounted in vertical guides 132 carried by the inner side of the plate 1. The block 131 is provided with an ejector pin 133 adapted to extend upwardly into the openings 49 of the plate 3 and raise the valves 123 to eject the pressed and molded article from each one of the molds 31. The mold ejector operates when the table is stationary, the pin 133 raising to eject the contents of the mold, while the plunger has entered another mold.

In order that the molds 31 can be correctly positioned, the table is provided with guide pins or lugs 131$^a$.

*General operation.*—Assuming that the table 36 revolves to the left, as shown by the arrow in Fig. 6 the molds 31 placed upon said table receive a batch of glass in front of the standards 21, whereby when a mold is moved beneath the plunger and temporarily held, the glass contained within said mold can be pressed. After the plunger is withdrawn and the table 36 is revolved to place another mold beneath the plunger, the pressed and shaped glass within the mold 31 is ejected, at the right hand side of the machine. Assuming further, that the motor 12 is in operation, the shaft 8 will be revolved, but the shaft 16 cannot revolve until the clutch members 98 and 101 are thrown into engagement with the wood disk 100. The operator at the rear end of the machine manipulates the lever 100$^b$ and in so doing, shifts the disk 92 causing the beveled lugs 93 to ride upon the beveled lugs 94 of the fixed disk 95 forcing the disk 92 into engagement with the cams 96 and causing said cams to throw the clutch member 101 into engagement with the disk 100. As this disk is mounted upon the shaft 8, said disk will be revolved, also the clutch members 101, 98 and the gear wheel 14 carried by the clutch member 98. A revoluble movement will then be imparted to the shaft 16 through the medium of gears 14, 15. As this shaft revolves, the table 36 is intermittently revolved through the medium of the "Geneva" movement previously described. As the shaft 16 rotates, the crank 17 thereof through the medium of the secondary dwell control, imparts a reciprocating movement to the pitmen 24 and lowers and raises the mold-die 28 into the mold-die or mold 31.

Traveling with the shaft 16 is the arm 65, and as this arm engages the depending end 58 of the lever 56, said lever is moved rearwardly to place the feed head 61 in engagement with the screw or worm 63, which is now revolving. As said lever is swung upon the plate 52, the finger 67 of said plate gradually travels in to engagement with the shoulder 68 of the bar 69 and shifts the slide rod 71, which through the medium of the crank 76, shaft 77, arm 90 and link 91 moves the disk 92 and allows the clutch member 101 to release the disk 100 fixed on the shaft 8, and rotation of shaft 16 immediately ceases.

When the machine is placed in operation, the plunger descends and its downward movement does not stop until the shaft 16 is placed out of operation, as just described, the dwell of the plunger within the mold commencing with the cessation of rotation of the shaft 16 and continues until the following operation. When the arm 65 becomes disengaged from the lever 56, the plate 52 and the lever 56 immediately assume their normal position. As the plate 52 assumes its normal position, the finger 67 thereof engages the shoulder 68$^a$ of the member 69 and starts the machine, causing the plunger to elevate. The period of time for the plunger to dwell in the mold is therefore the time consumed in the lever 56 releasing the arm 65, and this period of dwell is adjusted through the medium of the cam 83, gear wheel 84, worm 85 and rod 86. With the machine again in operation, the upward movement of the plunger is controlled by the machine being placed out of operation, this being accomplished by the arm 80 engaging the arm 79 and moving the clutch member 101 out of engagement with the disk 100. In order that the shaft 77 can be moved, and the slide rod 71 connected thereto, the arm 82 in lowering, lowers the bar 69, whereby said bar will not interfere with the finger 67, and will be correctly positioned, for the next operation of the primary dwell controller.

As heretofore stated, the primary dwell controller limits the dwell from two to ten seconds, but should the pressure of the plunger be of less duration than that of the primary controller, the secondary dwell controller is utilized.

The duty of the secondary dwell controller is to cause a short dwell and control the pressure on the plunger, for instance, when there is more glass cut into the mold than what is required to fill the same, the dwell controller yields, the wedge 107 being forced outwardly, placing the spring 118 under tension, allowing the housings 102 and 103 to move toward one another and relieve the pressure on the plunger. In other words, the secondary dwell controller corresponds to a rigid connection designed for doing work at a prescribed pressure and yieldable when the pressure exceeds the normal.

To assist in returning the plunger to an elevated position, the shaft 19 is provided with a weighted arm 200.

After the glass has been molded, and pressed within the mold-die 31, the contents thereof are ejected when the mold-die is stopped above the pin 133. This pin when actuated by the heart-shaped cam 124 is adapted to elevate the plug 123 and allow the molded and pressed article within the mold-die 31 to be gripped and removed.

While in the drawings forming a part of this application there is illustrated the preferred embodiments of my invention, I would have it understood that the details of construction can be varied or changed as to the shape, proportion and manner of assemblage without departing from the spirit of the invention.

Having now described my invention what I claim as new, is:—

1. In a glass molding machine, the combination with a movable frame, a drive shaft carried thereby, an operating shaft journaled in said frame, a driven shaft journaled in said frame and operated through the medium of said driven shaft and said operating shaft, standards supported by said frame, and a plunger mounted for reciprocation upon said standards and operated by said driven shaft, of a table revolubly mounted upon said frame and adapted to support a mold beneath said plunger, a "Geneva" movement actuated by said drive shaft for intermittently moving said table, clutch members located upon said drive shaft for controlling the operation of said operating shaft, a primary dwell controller supported at one side of said machine, said controller comprising a lever actuated by said operating shaft for stopping and starting said machine through the medium of said clutch members, means for limiting the movement of said lever, a secondary dwell controller operably connecting said operating shaft and said driven shaft, said secondary dwell controller comprising a yieldable connection having telescopic housings and an interposed wedge, means for adjusting the yielding movement of said wedge, an ejector adapted to enter said molds, said ejector comprising a cam actuated pin adapted to move upwardly through said frame and said table, and means in connection with said frame for controlling the operation of said clutch members, substantially as described.

2. In a glass molding machine, the combination with a movable frame, a drive shaft, an operating shaft, a driven shaft, and a plunger mounted for reciprocation above said frame and actuated by said driven shaft, of a table revolubly mounted upon said frame and adapted to support a mold beneath said plunger, a "Geneva" movement actuated by said drive shaft for intermittently moving said table, clutch members located upon said drive shaft for controlling the operation of said operating shaft, a primary dwell control supported at one side of said machine and actuated by said operating shaft for stopping and starting said machine through the medium of said clutch members, a secondary dwell control operably connecting said operating shaft and said driven shaft for controlling the dwell of said plunger in a mold carried by said table, and an ejector pin actuated by said operating shaft and adapted to move upwardly through said frame and said table for ejecting the contents of a mold carried by said table.

3. In a glass molding machine, the combination of a frame, an operating shaft journaled in said frame, a driven shaft journaled in said frame and adapted to be driven by said operating shaft, a reciprocating plunger arranged above said frame and actuated by said driven shaft, a table revolubly mounted upon said frame and adapted to support a mold beneath said plunger, means actuated by said operating shaft for intermittently moving said table beneath said plunger, a primary dwell controller supported at one side of said machine for controlling the operation of said operating shaft, a secondary dwell controller operatively connecting said operating shaft and said driven shaft for controlling the dwell of said plunger in a mold upon said table, means supported by said frame independent of said controllers for controlling the operation of the operating shaft, and an ejector pin supported by said frame and actuated by said operating shaft for moving upwardly through said frame and said table for ejecting the contents of a mold upon said table.

4. In a glass molding machine, the combination of a frame, an operating shaft journaled in said frame, a driven shaft journaled in said frame and adapted to be driven by said operating shaft, a reciprocating plunger arranged above said frame and actuated by said driven shaft, a table revolubly mounted upon said frame and adapted to support a mold beneath said plunger, means actuated by said operating shaft for intermittently moving said table beneath said plunger, a primary dwell controller supported at one side of said machine for controlling the operation of said operating shaft, a secondary dwell controller operatively connecting said operating shaft and said driven shaft for controlling the dwell of said plunger in a mold upon said table, and means supported by said frame independent of said controller for controlling the operation of the operating shaft.

5. In a glass molding machine, the combination with a movable frame, a drive shaft, an operating shaft, and a driven shaft, of a revoluble table arranged upon said frame, a Geneva movement actuated by said drive shaft for intermittently moving said table, a plunger supported by said frame above said table and adapted to be reciprocated by said driven shaft, clutch members located upon said drive shaft and controlling the operation of said operating shaft, a dwell controller connecting said operating shaft and said driven shaft, said dwell controller comprising telescopic housings, a yieldable wedge supported between said housings, a bell crank lever supporting said wedge, a spring arranged above said housings for holding said bell crank lever and said wedge, means supported by said housings for adjusting the tension of said spring, and means supported by said frame for controlling the operation of said clutch members.

6. In a glass molding machine, the combination of a movable frame, a drive shaft carried thereby, a main operating shaft and a driven shaft, clutch members located upon said drive shaft for controlling the operation of said main operating shaft, a table revolubly supported upon said frame, a Geneva movement actuated by said main operating shaft for intermittently moving said table, a plunger located above said table and adapted to be reciprocated by said driven shaft, a dwell controller connecting said driven shaft and said main operating shaft, said dwell controller comprising telescopic housings having a yieldable connection, and means supported by said frame for controlling the operation of said clutch members.

7. In a glass molding machine, the combination with a movable frame, a main operating shaft journaled in said frame, a driven shaft journaled in said frame, a plunger arranged above said frame and adapted to be reciprocated by said driven shaft, a table revolubly mounted upon said frame and adapted to be intermittently moved beneath said plunger, a dwell controller connecting said operating shaft with said driven shaft, said dwell controller comprising telescopic housings, and an adjustable and yieldable connection between said housings.

8. In a glass molding machine, the combination with a frame, an operating shaft journaled in said frame, and a driven shaft journaled in said frame, of a plunger arranged above said frame and adapted to be reciprocated by said driven shaft, a table revolubly mounted upon said frame and adapted to be intermittently moved beneath said plunger, molds supported upon said table, means connecting said operating shaft with said driven shaft for controlling the dwell of said plunger in the mold supported by said table, and an ejector pin supported by said frame and actuated by said operating shaft to move upwardly through said frame and said table to eject the contents of the mold supported by said table.

9. In a glass molding machine, the combination with a frame, an operating shaft journaled in said frame, and a driven shaft journaled in said frame, of a plunger arranged above said frame and adapted to be reciprocated by said driven shaft, a table revolubly mounted upon said frame and adapted to be intermittently moved beneath said plunger, molds supported upon said table, and means connecting said operating shaft with said driven shaft for controlling the dwell of said controller in the mold supported by said table.

10. In a glass molding machine, the combination of a frame, an operating shaft journaled in said frame, a driven shaft journaled in said frame and driven by said operating shaft, a reciprocating plunger located above said frame and actuated by said driven shaft, an intermittently moving table supported by said frame for moving molds beneath said plunger, said table being actuated by said operating shaft, a dwell controller in connection with said operating shaft for starting and stopping said machine, and means independent of said dwell controller for controlling the operation of said operating shaft.

11. A glass molding machine comprising an intermittently moving table adapted to support molds, a reciprocating plunger arranged above said table for entering the molds carried thereby, shafts for operating said table and said plunger, and a yieldable connection between said shafts for controlling the dwell of said plunger in a mold carried by said table.

12. A glass molding machine comprising an intermittently moving table adapted to support a mold, a reciprocating plunger arranged above said table for entering the mold carried thereby, means for operating said table and plunger, a primary dwell controller for controlling the dwell of said punger in a mold carried by said table, and a secondary dwell controller for relieving excessive pressure on the plunger.

In testimony whereof I affix my signature in the presence of two witnesses.

ALBERT STRUB.

Witnesses:
  George W. Woods,
  Jos. C. Rouzer.